United States Patent
Sato

(10) Patent No.: US 10,084,610 B2
(45) Date of Patent: Sep. 25, 2018

(54) CONTROL APPARATUS AND CONTROL METHOD

(71) Applicant: KYOCERA Corporation, Kyoto-shi, Kyoto (JP)

(72) Inventor: Yuri Sato, Kyoto (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/115,454

(22) PCT Filed: Jan. 29, 2015

(86) PCT No.: PCT/JP2015/052589
§ 371 (c)(1),
(2) Date: Jul. 29, 2016

(87) PCT Pub. No.: WO2015/115571
PCT Pub. Date: Aug. 6, 2015

(65) Prior Publication Data
US 2017/0180150 A1 Jun. 22, 2017

(30) Foreign Application Priority Data

Jan. 29, 2014 (JP) ................... 2014-014944

(51) Int. Cl.
*H04L 12/28* (2006.01)
*G08C 17/02* (2006.01)
(Continued)

(52) U.S. Cl.
CPC .......... *H04L 12/2818* (2013.01); *G08C 17/02* (2013.01); *G05B 15/02* (2013.01); *H02J 13/00* (2013.01); *H04L 2012/2841* (2013.01)

(58) Field of Classification Search
CPC ........ H04L 12/2818; H04L 2012/2841; G08C 17/02; G05B 15/02; H02J 13/00
See application file for complete search history.

(56) References Cited

U.S. PATENT DOCUMENTS

| 9,055,259 B2* | 6/2015 | An | H04N 5/44504 |
| 2011/0106279 A1* | 5/2011 | Cho | G08C 17/02 700/90 |

(Continued)

FOREIGN PATENT DOCUMENTS

| JP | 2006-203516 | 8/2006 |
| JP | 2006203516 A * | 8/2006 |

(Continued)

OTHER PUBLICATIONS

International Search Report and Written Opinion of the International Searching Authority issued by the Japanese Patent Office for International Application No. PCT/JP2015/052589.

(Continued)

*Primary Examiner* — Mohamed Barakat
(74) *Attorney, Agent, or Firm* — Procopio Cory Hargreaves and Savitch LLP

(57) ABSTRACT

A control apparatus controls consumer equipment provided in a power consumer facility. The control apparatus comprises a controller configured to transmit, information indicating an operatable function capable of being operated by an operation apparatus operating the consumer equipment among a plurality of functions of the consumer equipment, to the operation apparatus, when the control apparatus is connected to the operation apparatus via a first network provided in the consumer facility. The controller is further configured to transmit a request message for requesting execution of a function designated from the operatable function to the consumer facility, when the control apparatus receives an operation instruction of the designated function of the operatable function from the operation apparatus. The controller is further configured to select the operatable function among the plurality of functions according to (Continued)

whether the operation apparatus is located outside the consumer facility.

6 Claims, 7 Drawing Sheets

(51) Int. Cl.
  *G05B 15/02* (2006.01)
  *H02J 13/00* (2006.01)

(56) References Cited

U.S. PATENT DOCUMENTS

| | | | | |
|---|---|---|---|---|
| 2012/0286924 A1* | 11/2012 | Goto | .................. | G05B 15/02 |
| | | | | 340/4.31 |
| 2013/0183042 A1* | 7/2013 | Knapp | .................. | G08C 23/04 |
| | | | | 398/106 |
| 2013/0214935 A1* | 8/2013 | Kim | .................. | H04L 12/2816 |
| | | | | 340/870.02 |
| 2014/0167928 A1* | 6/2014 | Burd | .................. | G06F 17/30893 |
| | | | | 340/12.5 |

FOREIGN PATENT DOCUMENTS

| | | |
|---|---|---|
| JP | 2010-128810 | 6/2010 |
| JP | 2012-253756 | 12/2012 |
| JP | 2013-005657 A | 1/2013 |

OTHER PUBLICATIONS

Extended European Search Report dated Aug. 22, 2017, issued by the European Patent Office in counterpart European Patent Application No. 15 74 2621.4.

* cited by examiner

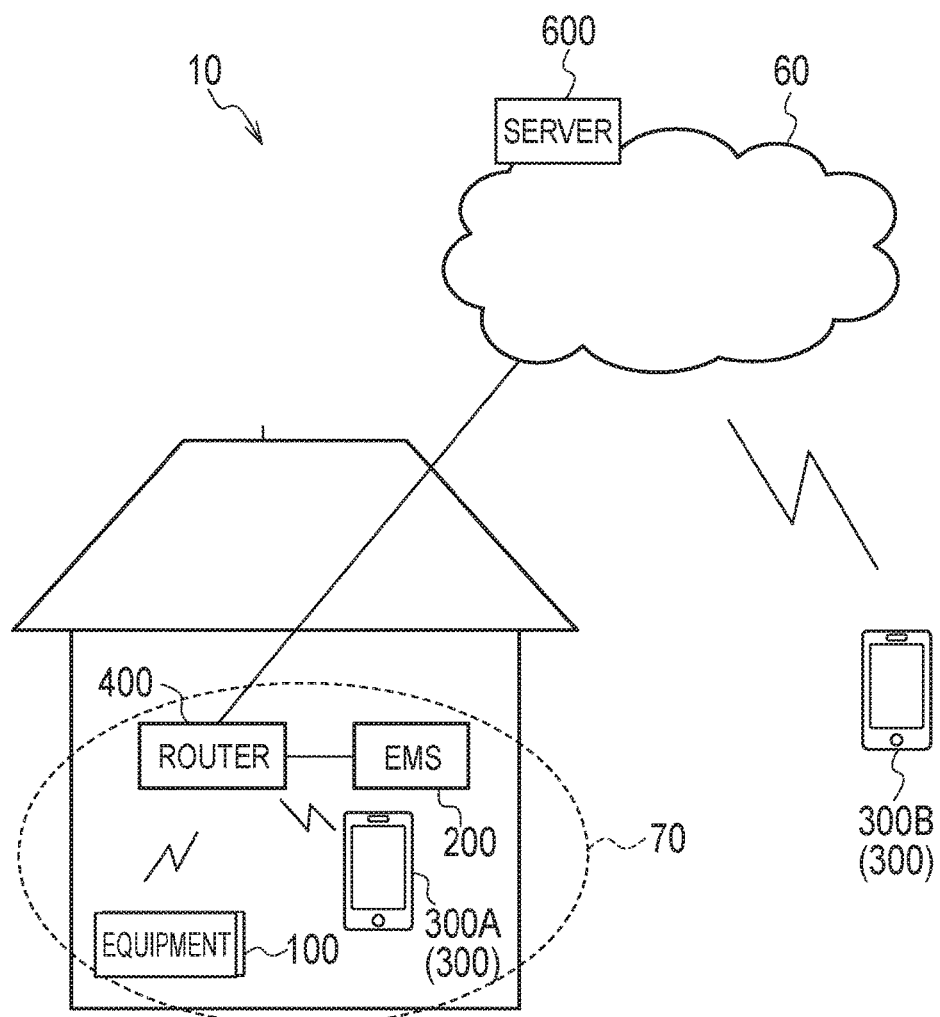

FIG. 5

|   | PROPERTY NAMES | SET | GET |
|---|---|---|---|
| 1 | OPERATION STATE | ○ | ○ |
| 2 | OPERATION MODE SETTING | ○ | ○ |
| 3 | QUICK OPERATION MODE SETTING | ○ | ○ |
| 4 | TEMPERATURE SETTING VALUE | ○ | ○ |
| 5 | RELATIVE HUMIDITY SETTING VALUE IN DEHUMIDIFICATION MODE | ○ | ○ |
| 6 | INDOOR RELATIVE HUMIDITY MEASUREMENT VALUE | — | ○ |
| 7 | INDOOR TEMPERATURE MEASUREMENT VALUE | — | ○ |
| 8 | OUTDOOR TEMPERATURE MEASUREMENT VALUE | — | ○ |
| 9 | AIR FLOW SETTING | ○ | ○ |
| 10 | AIR DIRECTION SWING SETTING | ○ | ○ |
| 11 | ON-TIMER RESERVATION SETTING | ○ | ○ |
| 12 | ON-TIMER RELATIVE TIME SETTING VALUE | ○ | ○ |
| 13 | OFF-TIMER RESERVATION SETTING | ○ | ○ |
| 14 | OFF-TIMER RELATIVE TIME SETTING VALUE | ○ | ○ |

FIG. 6

| ACCESS TYPE | PROPERTIES AVAILABLE FOR SET OPERATION |
|---|---|
| INDOOR | 1,2,3,4,5 9,10,11,12,13,14 |
| OUTDOOR | 13,14 |

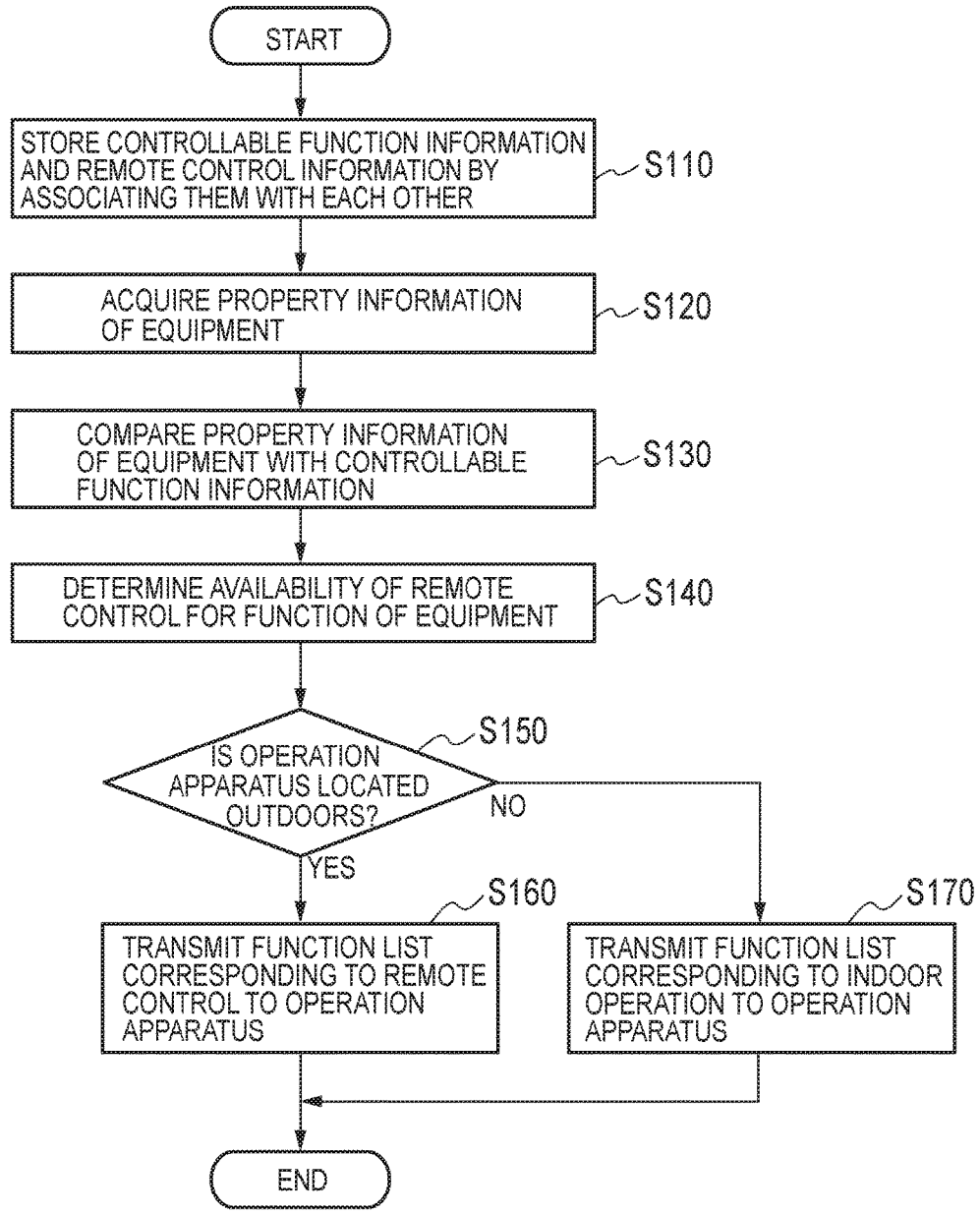

FIG. 8

| STATE OF EMS | PROPERTIES AVAILABLE FOR SET REQUEST |
|---|---|
| NORMAL OPERATION STATE | 1,2,3,4,5 9,10,11,12,13,14 |
| ABNORMAL STATE | 13,14 |
| POWER SAVING STATE | 4,9,10,13,14 |

CONTROL APPARATUS AND CONTROL METHOD

TECHNICAL FIELD

The present invention relates to a control apparatus and a control method for controlling equipment provided in a power consumer facility.

BACKGROUND ART

In recent years, control apparatuses for controlling equipment provided in power consumer facilities (see, e.g., Patent Literature 1) have attracted public attention. Such control apparatuses are called energy management systems (EMS). Examples of the equipment include a load (e.g., an air conditioner, a lighting tool, or a refrigerator) that consumes power for operation, or a distributed power source (e.g., a photovoltaic generation apparatus, a storage battery apparatus, or a fuel cell apparatus).

Examples of the control apparatuses include a home energy management system (HEMS), a building energy management system (BEMS), a factory energy management system (FEMS), a store energy management system (SEMS), and a cluster/community energy management system (CEMS). The control apparatus transmits a request message for requesting execution of a function, which is designated from a plurality of functions of the equipment, to the equipment via a network provided in the consumer facility.

Meanwhile, an increasing number of smart phones, tablet terminals, and the like are used as operation apparatuses for operating the equipment. The operation apparatus generates an operation instruction for the equipment in accordance with information input by a user, and transmits the operation instruction to the control apparatus. The control apparatus acquires the operation instruction from the operation apparatus, generates the request message in accordance with the operation instruction, and transmits the generated request message to the equipment.

The operation apparatus enables remote control of the equipment from the outside of the consumer facility. Controlling the equipment from outside, however, requires higher consideration on safety than operating the equipment from the inside of the consumer facility, because checking the operation state of the equipment from the outside of the consumer facility is difficult.

CITATION LIST

Patent Literature

SUMMARY

A control apparatus according to a first aspect controls consumer equipment provided in a power consumer facility. The control apparatus comprises a controller configured to transmit, information indicating an operatable function capable of being operated by an operation apparatus operating the consumer equipment among a plurality of functions of the consumer equipment, to the operation apparatus, when the control apparatus is connected to the operation apparatus via a first network provided in the consumer facility. The controller is further configured to transmit a request message for requesting execution of a function designated from the operatable function to the consumer facility, when the control apparatus receives an operation instruction of the designated function of the operatable function from the operation apparatus. The controller is further configured to select the operatable function among the plurality of functions according to whether the operation apparatus is located outside the consumer facility.

A control method according to a second aspect is a control method of a control apparatus for controlling consumer equipment provided in a power consumer facility. The control method comprises: transmitting, information indicating an operatable function capable of being operated by an operation apparatus operating the consumer equipment among a plurality of functions of the consumer equipment, to the operation apparatus, when the control apparatus is connected to the operation apparatus via a first network provided in the consumer facility; transmitting a request message for requesting execution of a function designated from the operatable function to the consumer equipment, when the control apparatus receives an operation instruction of the designated function of the operatable function from the operation apparatus; and selecting the operatable function among the plurality of functions according to whether the operation apparatus is located outside the consumer facility.

BRIEF DESCRIPTION OF DRAWINGS

FIG. 4 illustrates a scene using a control system 10 according to the embodiment.

FIG. 5 illustrates a property table according to the embodiment.

FIG. 6 illustrates remote control information according to the embodiment.

FIG. 7 is a flowchart illustrating a control method according to the embodiment.

FIG. 8 illustrates control information by operation state according to a modification of the embodiment.

DESCRIPTION OF EMBODIMENTS

Hereinafter, the control system according to the embodiment will be described. Note that the same or similar reference signs are applied to the same or similar portions in the following descriptions of the drawings.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

Overview of Embodiment

A control apparatus according to the embodiment controls consumer equipment provided in a power consumer facility. The control apparatus comprises: a controller configured to transmit, information indicating an operatable function capable of being operated by an operation apparatus operating the consumer equipment among a plurality of functions of the consumer equipment, to the operation apparatus, when the control apparatus is connected to the operation apparatus via a first network provided in the consumer facility. The controller is further configured to transmit a request message for requesting execution of a function designated from the operatable function to the consumer facility, when the control apparatus receives an operation instruction of the designated function of the operatable function from the operation apparatus. The controller is further configured to select the operatable function among the plurality of functions according to whether the operation apparatus is located outside the consumer facility.

In the embodiment, the operatable function is selected among the plurality of functions of the equipment according to whether the operation apparatus is located outside the consumer facility. The control apparatus and the control method capable of increasing safety and improving convenience of the operation apparatus can be provided.

Embodiment (Control System)

Figure 1:
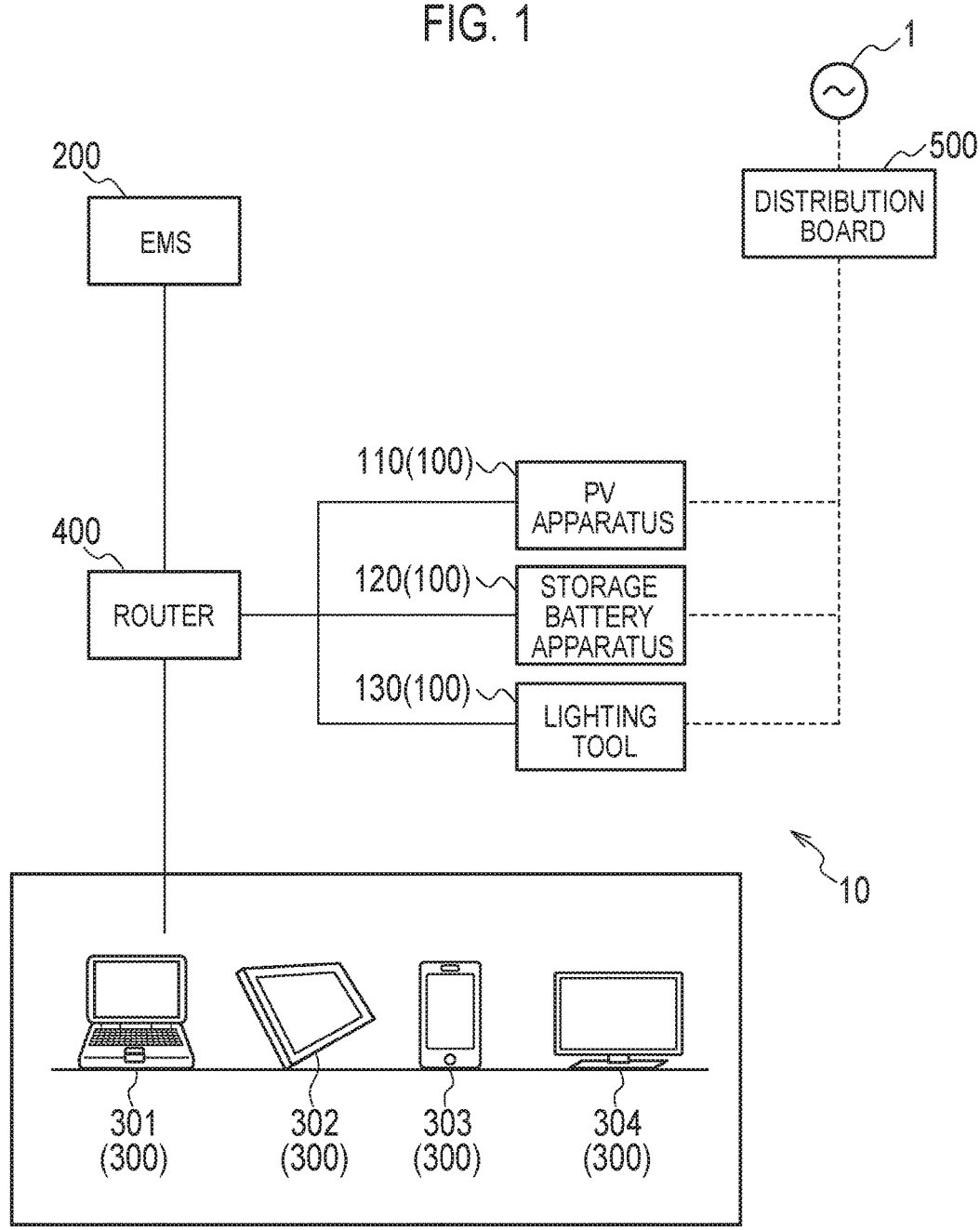
FIG. 1 illustrates a control system according to an embodiment.

A control system according to an embodiment will be described below. FIG. 1 illustrates a control system 10 according to the embodiment.

The control system 10 includes equipment 100 provided in a consumer facility, an EMS 200, and an operation apparatus 300, as illustrated in FIG. 1. In FIG. 1, a solid line indicates a signal line for transmitting signals and a broken line indicates a power line for transmitting electric power. A wired or radio signal line may be used.

The equipment 100 is, for example, a load that operates by consuming electric power, or a distributed power source that outputs electric power. The load consumes electric power received via the power line. Examples of the load include home electric equipments, such as a refrigerator, a freezer, a lighting tool, or an air conditioner. Examples of the distributed power source include a photovoltaic generation apparatus (PV apparatus), a storage battery apparatus, and a fuel cell apparatus. FIG. 1 illustrates a PV apparatus 110, a storage battery apparatus 120, and a lighting tool 130 as examples of the equipment 100.

A distribution board 500 is connected to a distribution line 1 (grid). The distribution board 500 is connected to the equipment 100 (the PV apparatus 110, the storage battery apparatus 120, and the lighting tool 130) via the power line.

The PV apparatus 110 is a photovoltaic generation apparatus that generates electric power in response to reception of solar light. The PV apparatus 110 converts generated DC power to AC power, and outputs the AC power to the distribution board 500 via the power line. The PV apparatus 110 changes its power generation amount according to an insolation amount.

The storage battery apparatus 120 stores electric power. The storage battery apparatus 120 converts the AC power supplied from the grid 1 to the DC power, and stores the DC power. The storage battery apparatus 140 converts the output DC power into the AC power, and outputs the AC power to the distribution board 500 via the power line.

The lighting tool 130 operates by consuming power output from the distribution board 500.

The EMS 200 is an example of the control apparatus (energy management system) for controlling and managing the equipment 100.

The EMS 200 is connected to the PV apparatus 110, the storage battery apparatus 120, and the lighting tool 130 via a narrow area network (first network) provided in the consumer facility. The first network is, for example, a home area network that includes a router 400, a signal line, and the like.

The EMS 200 receives/transmits a message from and to the equipment 100 in accordance with a predetermined communication protocol. The EMS 200 thus controls and manages the equipment 100. Examples of the predetermined communication protocol include ECHONET Lite (registered trademark). The equipment 100 and the EMS 200 that support the ECHONET Lite (registered trademark) function as ECHONET Lite (registered trademark) nodes defined in the ECHONET Lite (registered trademark).

The EMS 200 may be connected to servers via a public network (second network) such as the Internet. The EMS 200 may acquire, from the servers, information such as unit buying price or unit selling price of electric power from and to the grid 1.

The operation apparatus 300 operates the equipment 100. Examples of the operation apparatus 300 include a personal computer 301, a tablet terminal 302, a smart phone 303, and a television 304. The operation apparatus 300 can operate the equipment 100 remotely from the outside of the consumer facility via the first and second networks.

(Structure of EMS)

Figure 2:
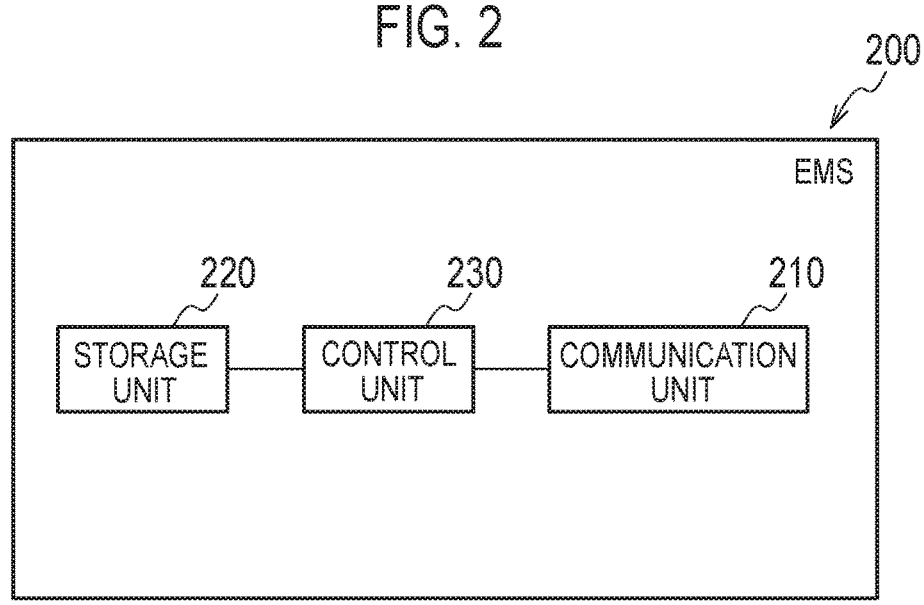
FIG. 2 is a block diagram illustrating an EMS according to the embodiment.

The EMS according to the embodiment is described below. FIG. 2 is a block diagram illustrating the EMS 200 according to the embodiment.

As illustrated in FIG. 2, the EMS 200 includes a communication unit 210, a storage unit 220, and a control unit 230.

The communication unit 210 communicates with the equipment 100 and the operation apparatus 300.

The communication unit 210 may receive information necessary for control and management of the equipment 100 from servers via the second network.

The storage unit 220 stores information necessary for control and management of the equipment 100. Specifically, the storage unit 220 stores information of the equipment 100. The information of the equipment 100 includes, for example, specification information indicating specifications of the equipment 100 (e.g., a maker code, a production serial number, a model, and the rated output or rated power consumption) and status information indicating the status of the equipment 100 (e.g., a power source state, temperature setting, power output or power consumption, and an operation mode).

The storage unit 220 stores information (i.e., controllable function information) that indicates functions (i.e., controllable functions) of the equipment that belongs to a controllable class. The controllable functions will be described later. The storage unit 220 further stores information (i.e., remote control information) that indicates whether remote control is available for the controllable functions. The storage unit 220 further stores information (i.e., control information by operation state) that indicates whether the controllable functions can be controlled according to the operation state of the EMS 200.

The control unit 230 controls the communication unit 210 and the storage unit 220.

The control unit 230 acquires information, from the equipment 100, indicating a plurality of functions of the equipment 100.

The control unit 230 transmits, to the equipment 100, a request message for controlling the equipment 100. Specifically, the control unit 230 generates the request message for requesting execution of a function designated from the plurality of functions of the equipment 100, and transmits the request message to the equipment 100 via the communication unit 210.

The control unit 230 transmits information to the operation apparatus 300 via the communication unit 210, the information indicating the operatable function that is operatable by the operation apparatus 300 among the plurality of functions of the equipment 100. The control unit 230 selects an operatable function among the plurality of functions of the equipment 100 according to whether the operation apparatus 300 is located outside the consumer facility.

When the control unit 230 receives, from the operation apparatus 300, an operation instruction for a function designated from the operatable functions, the control unit 230 generates the request message for requesting the execution of the designated function. The control unit 230 transmits the request message having been generated to the equipment 100 via the communication unit 210.

(Structure of Operation Apparatus)

Figure 3:
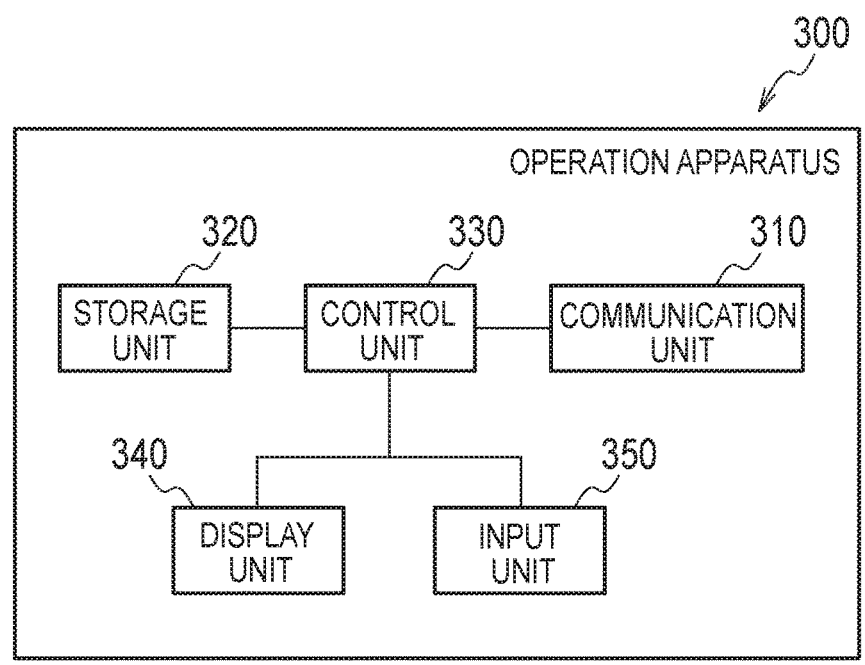
FIG. 3 is a block diagram illustrating an operation apparatus according to the embodiment.

An operation apparatus according to the embodiment is described below. FIG. 3 is a block diagram illustrating the operation apparatus 300 according to the embodiment.

The operation apparatus 300 includes a communication unit 310, a storage unit 320, a control unit 330, a display unit 340, and an input unit 350, as illustrated in FIG. 3.

The communication unit 310 communicates with the EMS 200 via the network provided in the consumer facility. The communication unit 310 may communicate with the equipment 100 when the operation apparatus 300 is in accordance with the predetermined communication protocol.

The storage unit 320 stores information acquired via the communication unit 310.

The control unit 330 controls the communication unit 310, the storage unit 320, and the display unit 340.

The control unit 330 generates the operation instruction to the EMS 200 for the equipment 100 in accordance with the information input by a user, and transmits the operation instruction to the EMS 200 via the communication unit 310.

The display unit 340 displays information of the equipment 100. Specifically, the display unit 330 displays information indicating the controllable functions.

The input unit 350 is, for example, a keyboard that allows the user to input information for control or management of the equipment 100. For example, the user inputs, from the input unit 350, information to be displayed on the display unit 340. Alternatively, the user designates a function to be controlled among the operatable functions, and inputs the information to operate the designated function from the input unit 350. The input unit 350 may be, for example, a touch panel that is formed integrally with the display unit 340.

(Scene of Use)

A scene of use according to the embodiment is described below. FIG. 4 illustrates a scene using a control system 10 according to the embodiment.

In FIG. 4, the consumer facility is illustrated as a private residence. A router 400 forms a first network 70 provided in the consumer facility. The router 400 may form a radio or wired LAN as the first network 70.

FIG. 4 illustrates examples of the operation apparatus 300 including an operation apparatus 300A connected to the first network 70 and an operation apparatus 300B connected to a second network 60. The operation apparatus 300A is, for example, a smart phone that is connected to the router 400 by radio or a personal computer that is connected to the router 400 by wired.

The operation apparatus 300A generates the operation instruction according to the information input by the user, and transmits the operation instruction to the EMS 200. The EMS 200, when received the operation instruction from the operation apparatus 300A, generates the request message according to the operation instruction, and transmits the generated request message to the equipment 100. The operation apparatus 300A thus operates the equipment 100 via the router 400 and the EMS 200.

The operation apparatus 300B is, for example, a smart phone capable of accessing a server 600.

The server 600 is provided on the second network 60 and is connected to the EMS 200 via the second network 60. The server 600 relays the operation instruction, which has been transmitted from the operation apparatus 300B, to the EMS 200.

Herein, the operation apparatus 300B is not constantly connected to the server 600. Further, it is not preferable, from a security point of view, to constantly keep a session between the EMS 200, which is connected to the first network 70 in the consumer facility, and the server 600. A fire wall is typically provided between the second network 60 and the first network 70 to protect apparatuses connected to the first network 70. This prevents free access from the server 600 to the EMS 200. Preferably, therefore, the server 600 transmits the operation instruction received from the operation apparatus 300B to the EMS 200 in response to an inquiry that is made regularly to the server 600 by the EMS 200.

But the embodiment is not limited to this. For example, the server 600 may transmit the operation instruction received from the operation apparatus 300B to the EMS 200 at predetermined timing by, for example, opening a port of the fire wall.

When relaying the operation instruction transmitted from the operation apparatus 300B to the EMS 200, the server 600 transmits the operation instruction to the EMS 200 with additional information indicating that the operation apparatus 300B has transmitted the operation instruction in the first embodiment. The EMS 200, after having acquired the operation instruction transmitted from the operation apparatus 300B, generates the request message in accordance with the operation instruction, as in the case of the operation apparatus 300A, and transmits the generated request message to the equipment 100. The operation apparatus 300B thus operates the equipment 100 remotely.

(Property Table)

The EMS 200 selects the operatable function as described below according to the embodiment. FIG. 5 illustrates a property table according to the embodiment. FIG. 6 illustrates remote control information according to the embodiment.

As described above, the operation apparatus 300 (operation apparatus 300A) can control the equipment 100 from the inside of the house (consumer facility), and the operation apparatus 300 (operation apparatus 300B) can also remotely control the equipment 100 from the outside of the house (consumer facility). In remotely controlling the equipment 100 with the operation apparatus 300B, safety precaution is further required compared to using the operation apparatus 300A, because checking the operation state of the equipment 100 from the outside of the house is difficult.

The EMS 200, therefore, selects an operatable function among a plurality of functions of the equipment 100 according to whether the operation apparatus 300 is located outside the consumer facility. In one example, the ECHONET Lite (registered trademark) is used as a predetermined communication protocol as described below.

First, as illustrated in FIG. 5, the EMS 200 (storage unit 220) stores a property table for the equipment (controllable equipment) that belongs to a class that can be controlled by the EMS 200. The controllable class of equipment is defined in the ECHONET Lite (registered trademark). The property table of FIG. 5 corresponds to the equipment that belongs to a class of air conditioners.

The property table of FIG. 5 includes data lines corresponding to "property names", "Set" and "Get". The data lines corresponding to the "property names" indicate names of items (properties) that identify the status of the controllable equipment. The data lines corresponding to the "Set" indicate whether a property setting function (Set command) is available for the corresponding property. The data lines corresponding to the "Get" indicate whether a property reference function (Get command) is available for the corresponding property. Thus, the "function" of the equipment refers to the property setting function of the equipment, or the property reference function of the equipment.

For example, both the property setting function and the property reference function are executable for the "operation state" property of the controllable equipment in FIG. 5. When the EMS 200 transmits the request message (Set command) to request changing the operation state to on-state to the controllable equipment, the controllable equipment executes the function to change the operation state of the equipment from off-state to on-state. The controllable equipment then generates a response message indicating that the function has been executed, and transmits the response message to the EMS 200. Similarly, when the EMS 200 transmits the request message (Get command) to request reference of the operation state, the controllable equipment transmits the response message including the information of the operation state (e.g., on-state) of the equipment to the EMS 200.

Next, the EMS 200 (storage unit 220) also stores remote control information indicating whether the remote control of the functions (controllable functions) of the controllable equipment, as illustrated in FIG. 6. In FIG. 6, an "access type" is indoor when the operation is from the operation apparatus 300A, and the "access type" is outdoor when the operation is remote control from the operation apparatus 300B. "Properties available for SET operation" illustrate properties capable of being set according to the operation instruction from the operation apparatus 300A and properties capable of being set according to the operation instruction from the operation apparatus 300B. The properties are indicated by item numbers of the property table illustrated in FIG. 5. Specifically, in the example of FIGS. 5 and 6, the properties capable of being set by the remote control among the controllable functions are the off-timer reservation function and the off-timer relative time setting value, as illustrated in FIG. 5.

The EMS 200 (control unit 230) then acquires information, from the equipment 10, indicating a plurality of functions of the equipment 10. The EMS 200 identifies functions, among the controllable functions, corresponding to the individual functions of the equipment 10. The EMS 200 determines whether the remote control is available for the individual functions of the equipment 10 according to the remote control information of the identified functions.

The EMS 200 thus selects the remotely controllable function from the plurality of functions of the equipment 10 when the operation apparatus 300 is determined to be the operation apparatus 300B located outdoors. The EMS 200 determines the operation apparatus 300 (operation apparatus 300B) to be located outdoors when the EMS 200 is further connected to the operation apparatus 300 via the second network 60 different from the first network 70. For example, the EMS 200 determines that the operation instruction is from the operation apparatus 300B when the transmitting address of the operation instruction received by the EMS 200 is the server 600.

(Control Method)

A control method according to the embodiment is described below. FIG. 7 is a flowchart illustrating the control method according to the embodiment.

As illustrated in FIG. 7, the EMS 200 stores information of the controllable functions and the remote control information by associating them with each other in step S110.

In step S120, the EMS 200 acquires the property information of the equipment 100. Specifically, the EMS 200 transmits the request message for requesting the property information to the equipment 100, and receives the property information in the response message that corresponds to the request message. The property information of the equipment 100 includes, for example, information of the property names of the equipment 100, as in the property table of FIG. 5, and information indicating whether the setting and reference are available for the properties of the equipment 100. The EMS 200 is informed of the class of the equipment 100 in accordance with the acquired property information.

In step S130, the EMS 200 compares the property information of the equipment 100 with the controllable function information.

In step S140, the EMS 200 determines whether the remote control is available for the functions of the equipment 100.

In step S150, the EMS 200 determines whether the operation apparatus 300 is located outdoors. Specifically, the EMS 200 determines the operation apparatus 300 to be located outdoors when the transmitting address of the message received from the operation apparatus 300 is the server 600. Meanwhile, the EMS 200 determines the operation apparatus 300 to be located indoors when the transmitting address of the message received from the operation apparatus 300 is the operation apparatus 300. If a result of determination is YES, the EMS 200 proceeds to the processing of step S160. If the result of determination is NO, the EMS 200 proceeds to the processing of step S170.

In step S160, the EMS 200 transmits a list of functions corresponding to the remote control to the operation apparatus 300 (operation apparatus 300B).

In step S170, the EMS 200 transmits a list of functions corresponding to the operation from inside of the house (indoor operation) to the operation apparatus 300 (operation apparatus 300A).

Modification

Figure 9:
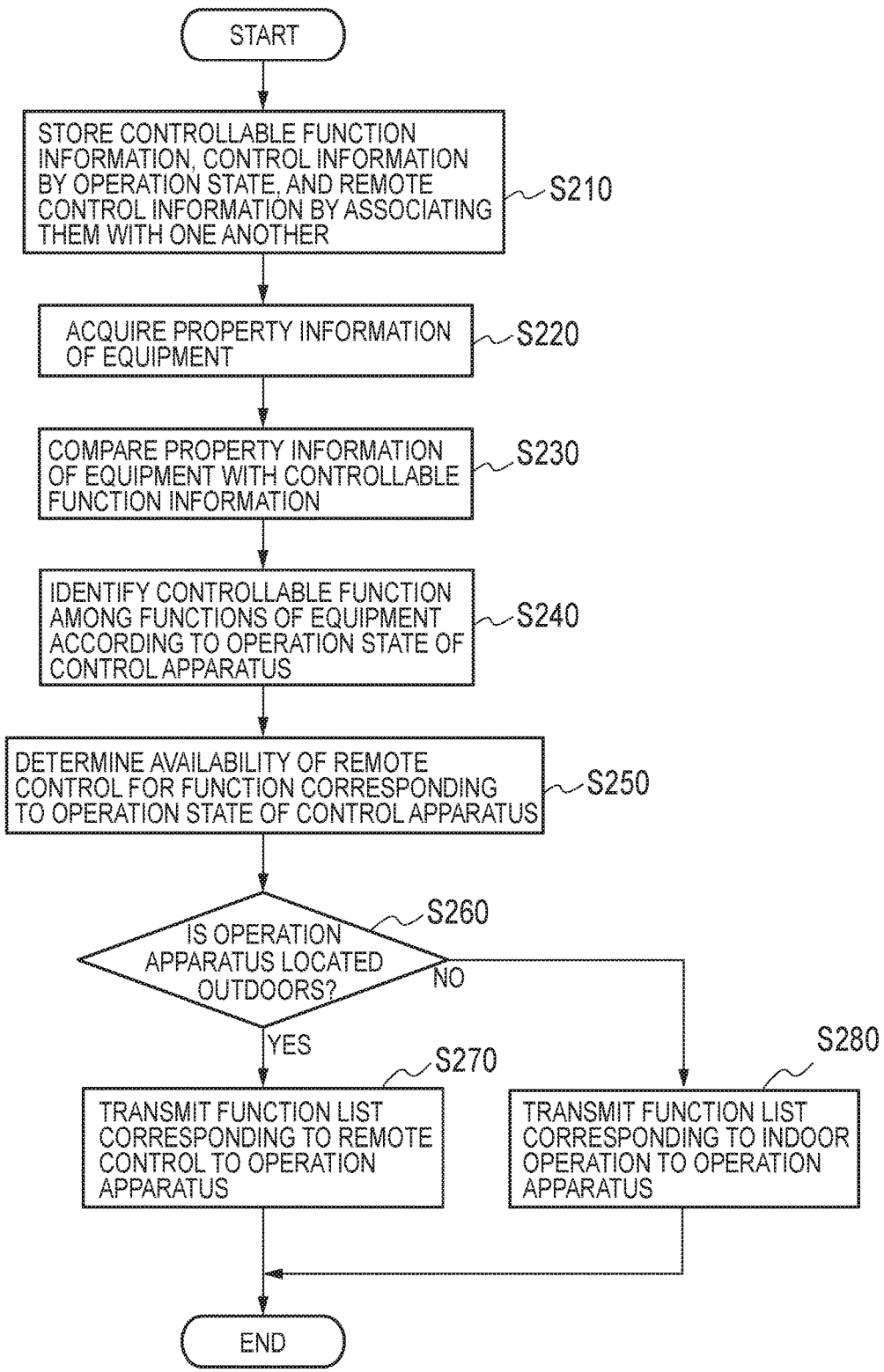
FIG. 9 is a flowchart illustrating a control method according to a modification of the embodiment.

A modification of the embodiment is described below. FIG. 8 illustrates control information by operation state according to a modification of the embodiment. FIG. 9 is a flowchart illustrating a control method according to the modification of the embodiment. The following description focuses on a difference between the modification and the embodiment.

In the modification, the EMS 200 (storage unit 220) also stores information (control information by operation state) indicating whether the control is available according to the operation state of the EMS 200.

As illustrated in FIG. 8, the "state of EMS" indicates that the operation state of the EMS 200 is, for example, a normal operation state in which the functions of the EMS 200 can be executed, an abnormal state such as a power-off state or a failure occurrence state, or a power saving state in which power consumption in the consumer facility needs to be reduced. "Properties available for SET operation" indicates properties capable of receiving the setting request (SET command) for each state of the EMS 200.

The EMS 200 selects the operatable function among the plurality of functions of the equipment 100 according to the operation state of the EMS 200 and whether the operation apparatus 300 is located outdoors.

As illustrated in FIG. 9, the EMS 200 stores the controllable function information, the control information by operation state of the EMS 200, and the remote control information by associating them in step S210.

In step S220, the EMS 200 acquires the property information of the equipment 100.

In step S230, the EMS 200 compares the property information of the equipment 100 with the controllable function information.

In step S240, the EMS 200 identifies the function, among the plurality of function of the equipment 100, capable of corresponding to the operation state of the EMS 200.

In step S250, the EMS 200 determines whether the remote control is available for the function capable of corresponding to the operation state of the EMS 200.

In step S260, the EMS 200 determines whether the operation apparatus 300 is located outdoors. If a result of determination is YES, the EMS 200 proceeds to the processing of step S270. If a result of determination is NO, the EMS 200 proceeds to the processing of step S280.

In step S270, the EMS 200 transmits the information indicating the function corresponding to the remote control to the operation apparatus 300 (operation apparatus 300B).

In step S280, the EMS 200 transmits the information indicating the function corresponding to the indoor operation to the operation apparatus 300 (operation apparatus 300A).

As described above, the operation apparatus 300 in the embodiments selects the operatable function among the plurality of functions of the equipment 100 according to whether the operation apparatus 300 is located outdoors (outside of the consumer facility). The EMS 200 can only set the functions having low risk of causing a power leakage accident, a fire, or the like, among the plurality of functions of the equipment 100 as remote controllable functions to increase safety. The operation apparatus 300 can improve its convenience when used indoors when the function corresponding to the indoor operation is selected. In addition, the operation apparatus 300 can prevent useless input of information and useless transmission of the operation instruction by stopping the transmission of the operation instruction for the unoperatable function.

In the modification, the operatable function is selected by further reflecting the operation state of the EMS 200. This prevents transmission of the operation instruction from the operation apparatus 300 when the function cannot be controlled because of the condition of the EMS 200, although the function is operatable depending on the positional condition of the operation apparatus 300.

Therefore, the control apparatus and the control method capable of increasing the security and improving the convenience of the operation apparatus are provided.

Other Embodiments

Although the embodiment of the present invention has been described above, it should not be understood that the description and drawings that constitute part of the above disclosure limit the present invention. Apparently, persons who have ordinary skill in the art would devise various other embodiments, examples, and operational techniques from this disclosure.

In the embodiments, the ECHONET Lite (registered trademark) is used as the predetermined communication protocol. The embodiment, however, is not limited to this, and another communication protocol (e.g., ZigBee (registered trademark) or KNX) other than the ECHONET Lite (registered trademark) as the predetermined communication protocol. Alternatively, the ECHONET Lite (registered trademark) may be used in combination with other communication protocol as the predetermined communication protocol.

In the embodiment, the operation apparatus 300 transmits the operation instruction to the EMS 200 and the EMS 200 transmits the request message to the equipment 100 in accordance with the operation instruction. The embodiment is not limited to this, and the operation apparatus 300 may directly transmit the operation instruction to the equipment 100 when the operation apparatus 300 corresponds to the predetermined communication protocol.

The EMS 200 may be the home energy management system (HEMS), the store energy management system (SEMS), the building energy management system (BEMS), or the factory energy management system (FEMS).

The entire contents of Japanese application No. 2014-14944 (filed on Jan. 29, 2014) have been incorporated into the description by reference.

INDUSTRIAL APPLICABILITY

According to the embodiments, the control apparatus and the control method capable of increasing the security and improving the convenience of the operation apparatus are provided.

The invention claimed is:

1. A control apparatus for controlling consumer equipment provided in a power consumer facility, the control apparatus comprising:
    a controller configured to
        select one or more operable functions among a plurality of functions of the consumer equipment according to an operation state of the control apparatus and whether or not an operation apparatus, which operates the consumer equipment, is located outside the consumer facility, the operation state being associated with the operable function, wherein the operation state comprises at least one of a normal operation state of the control apparatus, an abnormal state of the control apparatus, and a power saving state of control apparatus,
        transmit information, indicating the selected operable function, to the operation apparatus, and
        transmit a request message for requesting execution of a function designated from the selected operable function to the consumer equipment, when the control apparatus receives an operation instruction of the designated function of the operable function from the operation apparatus.

2. The control apparatus according to claim 1, wherein the controller is further configured to determine that the operation apparatus is located outside the consumer facility when the control apparatus is connected to the operation apparatus via a second network different from a first network connecting the control apparatus and the consumer equipment.

3. The control apparatus according to claim 2, wherein the second network is a public network.

4. A control method of a control apparatus for controlling consumer equipment provided in a power consumer facility, the control method comprising:
   transmitting, information indicating an operable function capable of being operated by an operation apparatus operating the consumer equipment among a plurality of functions of the consumer equipment, to the operation apparatus;
   transmitting a request message for requesting execution of a function designated from the operable function to the consumer equipment, when the control apparatus receives an operation instruction of the designated function of the operable function from the operation apparatus; and
   selecting the operable function among the plurality of functions according to an operation state of the control apparatus and whether the operation apparatus is located outside the consumer facility, the operation state being associated to the operable function, wherein the operation state includes at least one of a normal operation state of the control apparatus, an abnormal state of the control apparatus, and a power saving state of control apparatus.

5. The control method according to claim 4, wherein the controller is further configured to determine that the operation apparatus is located outside the consumer facility when the control apparatus is connected to the operation apparatus via a second network different from a first network connecting the control apparatus and the consumer equipment.

6. The control method according to claim 5, wherein the second network is a public network.

* * * * *